United States Patent
Katz et al.

(10) Patent No.: US 8,584,139 B2
(45) Date of Patent: Nov. 12, 2013

(54) APPARATUS AND METHOD FOR CONNECTING INCOMPATIBLE COMPUTER SYSTEMS

(75) Inventors: Ari Katz, Tel-Aviv (IL); Daniel Mazor, Ottawa (CA); Ariel Laub, Tel-Aviv (IL)

(73) Assignee: SeaPass Solutions Inc., New York, NY (US)

( * ) Notice: Subject to any disclaimer, the term of this patent is extended or adjusted under 35 U.S.C. 154(b) by 1335 days.

(21) Appl. No.: 11/802,366

(22) Filed: May 22, 2007

(65) Prior Publication Data

US 2008/0005356 A1    Jan. 3, 2008

Related U.S. Application Data

(60) Provisional application No. 60/802,520, filed on May 23, 2006.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................... 719/313; 719/319; 719/320

(58) Field of Classification Search
None
See application file for complete search history.

(56) References Cited

U.S. PATENT DOCUMENTS

| | | | | |
|---|---|---|---|---|
| 6,499,042 | B1 * | 12/2002 | Markus | 715/217 |
| 7,185,272 | B2 * | 2/2007 | Pearce et al. | 715/207 |
| 2003/0014617 | A1 | 1/2003 | Tamboli et al. | |
| 2003/0065623 | A1 | 4/2003 | Corneil et al. | |
| 2003/0233397 | A1 | 12/2003 | Katz et al. | |

FOREIGN PATENT DOCUMENTS

WO    WO 2006/041340    4/2006

OTHER PUBLICATIONS

Official Action Dated Oct. 4, 2011 From the US Patent and Trademark Office U.S. Appl. No. 11/802,367.
Official Action Dated Apr. 5, 2012 From the US Patent and Trademark Office U.S. Appl. No. 11/802,367.

* cited by examiner

*Primary Examiner* — H S Sough
*Assistant Examiner* — Craig Dorais

(57) ABSTRACT

A proxy for location on a network between one or more client applications and a server application, comprises an input unit for receiving input data from a first client application and from a server application; a modifying unit for modifying server data by insertion of client data; and a handling unit for submitting the modified content data to the client to allow the client to review and further modify the client data within the server data and submit the modified data back to the proxy for subsequent submission to the server. The proxy thus uses client data to prefill web forms, using mapping and the like, which the client can then review and modify before submission to the server, thus avoiding substantial rekeying.

13 Claims, 10 Drawing Sheets

APPARATUS AND METHOD FOR CONNECTING INCOMPATIBLE COMPUTER SYSTEMS

RELATIONSHIP TO EXISTING APPLICATIONS

The present application claims the benefit of U.S. Provisional Patent Application No. 60/802,520, filed on May 23, 2006, the contents of which are hereby incorporated by reference.

FIELD AND BACKGROUND OF THE INVENTION

The present invention relates to apparatus and methods for building compatibility between different computer systems and, more particularly, but not exclusively to methods of data export and import between such incompatible systems.

There are several global industries in which different parties in the industry must transfer information to one another. It is often the case that these parties use different IT systems, which are not designed to communicate with one another. These systems lack a usable interface and/or connectivity capabilities.

An additional and, probably, the most problematic issue is incompatible business rules of the source and target systems. Often this is the main obstacle in connecting systems, even when both parties support an agreed data-transfer protocol.

As a result, at many stages of the process, data must be manually re-keyed, reformulated, revalidated, or manipulated multiple times so that it can be processed by a variety of incompatible systems. The complexity, redundancy, and manual nature of the process mean that errors may occur at multiple points, resulting in high costs and slow turnaround times.

Moreover some data elements are not available and are needed to be retrieved from different sources to be entered again for completing the process.

There are currently two possible solutions to these difficulties. The first is to build a special purpose interface and/or to undergo integration projects, in order to modify the existing systems so that the systems are capable of communicating with each other. This approach has the following disadvantages:

1. Integration projects between different systems are generally very expensive and time consuming, and require substantial cooperation from the different parties involved.
2. Additionally, the result is tailored to specific systems. Adding a new system, or changing one of the existing systems, generally requires changing the communication interface, or performing additional modifications of the systems, in order to accommodate the new conditions.
3. The source and target systems become dependant on each other. Changes to either one of the systems may impact the interface.

The second method currently in use for resolving communication difficulties between systems is to define a communication standard. Systems complying with the standard are able to communicate with other systems employing this standard. This approach has the following disadvantages:

1. Designing and maintaining a standard that will cover the continuously evolving needs of all industry members is a long and expensive process, requiring participation and support of all members.
2. Adopting a new standard is ineffective unless all the different systems support the adopted standard. For industries that are very diverse, achieving a unified standard is almost impossible.
3. Changing existing systems to comply with a new standard is very difficult. The changes required for each proprietary system are generally expensive and time consuming, especially for legacy applications.

None of the above approaches however, solves the problem of different business rules that are used by the source and target systems. Even if the systems are integrated and/or support a mutual communication standard, valid information from the source system may be deemed invalid and unacceptable by the target system.

The Insurance Industry

The insurance industry is an example of an industry which suffers from inefficiency due to incompatible data formats and greatly varying business rules of existing systems. For many years insurance companies have been providing the ability of entering data and performing transactions via terminal connection. In recent years many companies have moved to modern technology, using agents' portal web sites. However, this technological progress has not solved some intrinsic difficulties of agent-to-carrier communication:

Any information flow, such as quote calculation, policy submissions, endorsements, and policy information inquiries, requires entering the same information into several different systems. Even if the information was previously entered into the agency management system, the agent needs to reenter the information into the carrier's system, which is typically done either through a terminal or at the carrier's web site.

The information flow includes going to third party data providers to enter and fetch information such as a credit score, which is then entered into yet another system.

If a number of carriers participate in the process, for instance if the agent wishes to obtain multiple insurance quotes, the problem's complexity is multiplied.

The insurance industry in the U.S. has created standard formats for collecting and transferring data through ACORD (the Association for Cooperative Operations Research and Development). However, adoption of the ACORN standard Requires making changes to existing systems, Enables communication only between the parties that have adopted the standard, and perhaps more importantly, Does not solve the problem of incompatible business rules.

Why is Incompatible-Business-Rules a Hard-to-Solve Problem?

The most basic requirement of automated communication is proper transformation of the data. Even if some of the information is incompatible with the business rules of the target system, no data loss should occur, and the user should be given an opportunity to fix the original values to comply with these rules. The method of receiving the data from a source system, such as Agency management system, storing it and allowing a user to fix the data to comply with the business rules of the target system raises the following difficulties:

Problem 1: Storing the Data

Insurance carriers internal applications use proprietary data models that are designed to store only the data that is compliant with the carrier's business rules. For example, if in the carrier's system the field "limit" can receive the values "500,000" and "1,000,000", the system will either not handle or will need to be changed to support a required input value "700,000" from a source system.

Problem 2: Changing the Application

The existing applications are designed to receive information stage by stage, every time validating the data that has been gathered so far. The screens are designed to appear empty or with information compliant to the business rules. This means both application workflow and data entry screens need to be redesigned to support data import from source systems.

In the example referred to above, the upgraded system, cannot present a screen with an empty value for the limit, since this would constitute loss of information. Nevertheless it cannot enter the value since the target system will not accept it.

Both problems become even harder to solve, when the differences between ACORD XML and the carrier's data model are in the structure or hierarchy of the information. For example, the carrier's system might support only policy-level coverage, while in the agency management systems and ACORD XML coverage might be in respect of location or vehicle level. Since the data cannot be automatically mapped into a policy-level only model, the carrier's database and application would have to be expanded to accommodate any possible ACORD XML.

However, insurance industry members are often reluctant to make significant changes to their existing systems, due to The high costs of such projects.

Questionable return on investment (ROI) and usability of the upgraded system.

Long implementation and integration periods and the retraining required to company employees and users.

There is thus a widely recognized need for, and it would be highly advantageous to have, an interfacing system devoid of the above limitations.

SUMMARY OF THE INVENTION

According to one aspect of the present invention there is provided proxy apparatus for location on a network between one or more client applications and a server application, the apparatus comprising:

an input unit for receiving input data from a first client application and from a target server;

a modifying unit associated with said client data receiving unit configured for modifying data received from said server application by insertion therein of client data; and a handling unit configured for submitting said modified content data to said first or another client application to allow the first or another client application to further modify said client data within said content data and submit said content data back to said proxy apparatus for subsequent submission to said server.

According to a second aspect of the present invention there is provided a method of semi-automatic prefilling of client data into a web form issued by a server prior to submission to the server over a network, the method comprising:

submitting client data to said proxy, receiving from said proxy a version of the web form from said server with said submitted client data filled in;

modifying as necessary said filled in data; and submitting said modified form to said proxy for ongoing submission to said server.

According to a third aspect of the present invention there is provided a method of bridging between client and server web interfaces at a proxy server, comprising:

receiving data from said client web interface;

obtaining a data input form from said server interface, modifying said data input form by addition of said received client data, forwarding said modified input form to said client for further modification, receiving from said client said input form for submission to said server, submitting said form to said server and outputting to said client any error codes to allow for further modification, thereby to allow submission of said client data into said server interface.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
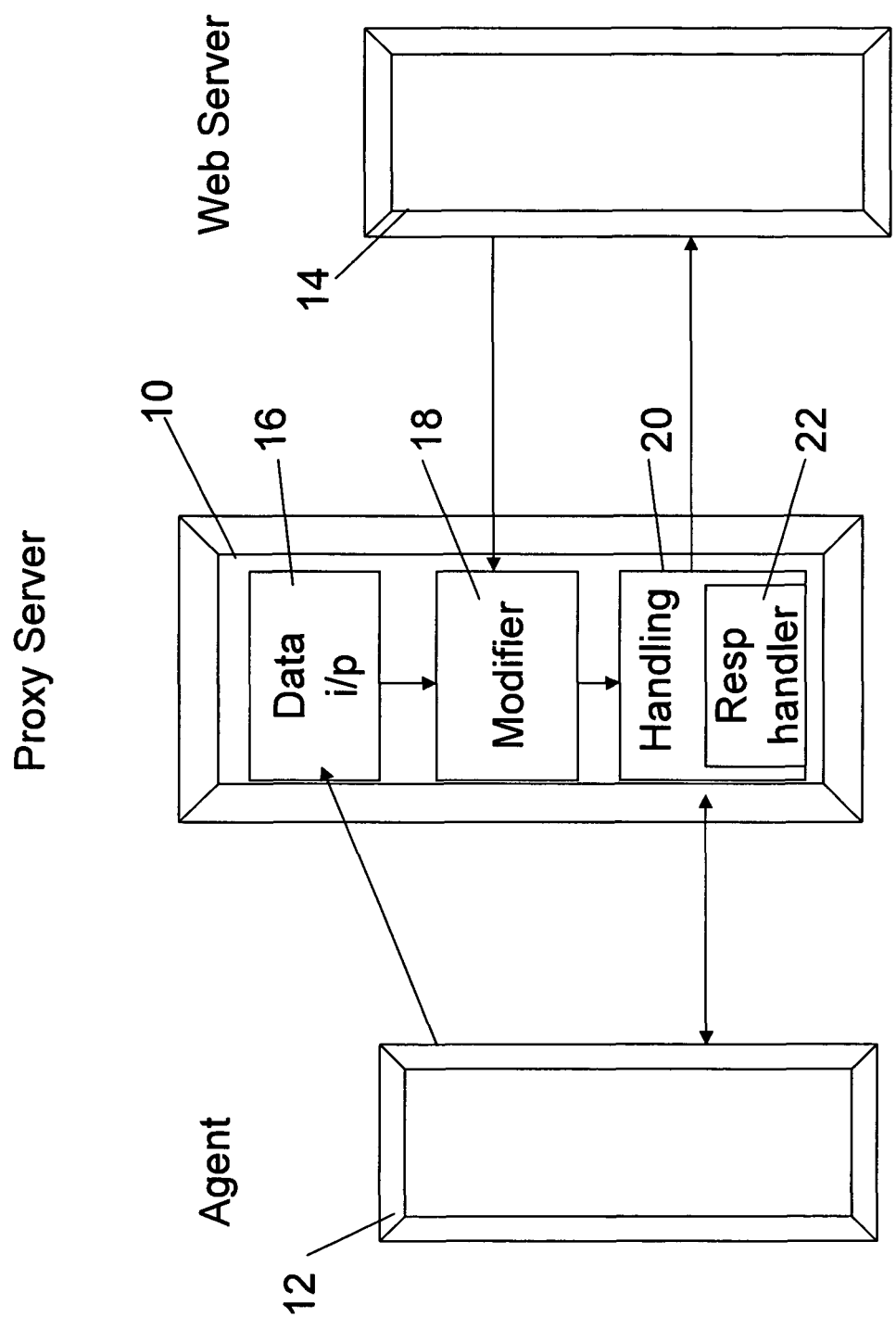
FIG. 1 is a simplified schematic diagram illustrating a proxy server according to a preferred embodiment of the present invention mediating between an agent system and a target system.

The present invention obviates the need for an insurance carrier to upgrade his system to be compatible with any other system. In one aspect of the present invention, instead of upgrading the insurance carrier's internal systems, an intermediary software application, hereinafter a smart proxy or smart bridge, resides between an agent's browser and an insurance carrier's web-site. The proxy uses client data exported from the agent to prefill web forms from the web site, using mapping and the like, which the agent can then review at the client and modify before submission to the server, thus avoiding substantial rekeying of his data and enabling him to respond to data incompatibility issues arising from the prefilling.

The Smart Proxy operates as a non-transparent reverse proxy between the agent's browser and carrier's web site. A standard transparent reverse web-proxy, forwards the information to and from the web-server as-is, without changing its content. However, Smart Proxy changes the HTML streams generated by the web-server by inserting data values into the relevant elements on the HTML forms that flow via Smart Proxy from the web-site to the agent's browser. From the agent's standpoint, the data entry screens of the carrier's web-site come pre-filled with information and the process flow is automated. This information is received from different data sources which include insurance agency management systems, third party data providers and other carrier systems.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates proxy apparatus 10 for location on a network between one or more client applications 12 and a server application 14. The apparatus comprises a data input unit 16 which receives input data from the agent 12 and content data from the server 14.

Typically the data from the agent is received from a client application at the agent. The client application is any application having a pre-defined interface and from which it is desired to export data to an application having a different interface. An example is an agency management system used by agents having multiple suppliers, such as but not limited to insurance agents.

A modifying unit 18 modifies content data from the server application. The content data is typically a web—based data input interface such as a web form. The modification comprises inserting the data from the client into the web form. Insertion of data at this stage is automatic as a mapping has already been made between the web form and the client's own data interface format. Interactive handling unit 20 then submits the modified content data back to the agent. That is to say the agent typically opens a web browser to act as a client application to the proxy, and the web form with the filled in data is sent back to the agent. The agent is able to check and if necessary modify the data and then submit the data when satisfied. The modified content preferably includes sufficient interactivity in the form of a submit button to allow the agent to submit the form. The submission is made to the proxy 10 which then passes it on to the web server 14.

The submission to the web server may be accepted or may be returned with errors. If it is returned with errors then response handling functionality 22 within the handling unit 20 includes any error codes as comments within the modified form which is then resubmitted to the agent. The agent is then able to take any necessary corrective action and the form is resubmitted. The process may be repeated until the data input is compatible with the server interface.

As mentioned, the content from server 14 is typically a web form having fields, typically labeled fields and the client data includes data already mapped to the various fields.

The modifying unit 18 preferably identifies cases where client data is incompatible with a requirement of a corresponding one of the data fields. In such a case the modification made to the content is not to enter the data into the field but rather to output a comment to the client application. The comment may usefully be included in the modified content being output to the agent.

The handling unit 20 preferably includes cookie management which transfers cookies between the server and the client in transparent fashion, as will be discussed in greater detail below.

The interactive handling unit may as necessary add program scripts to enhance interactivity at the agent, as will be discussed in greater detail below.

The interactive handling unit preferably also includes a domain name handling unit to replace domain name data of the content with domain name data of the proxy apparatus, so that output to the client application always links to the proxy and not to the web server, as will be explained in greater detail below.

Figure 2:
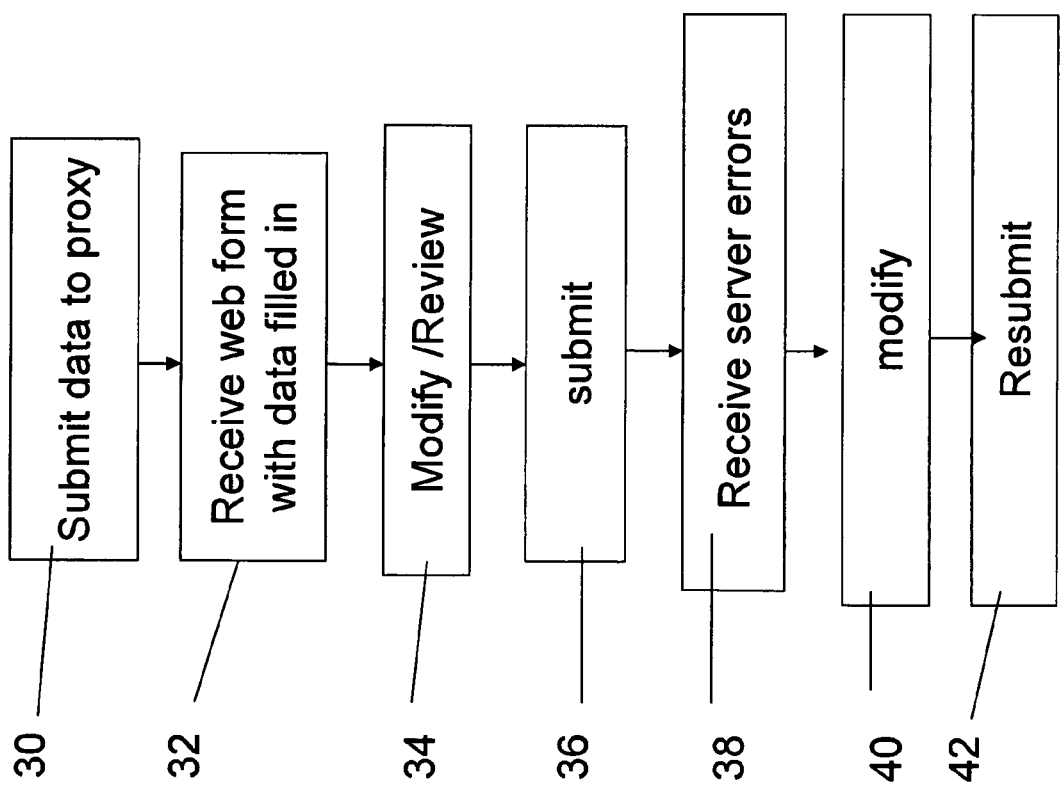
FIG. 2 is a simplified flow chart illustrating a procedure at the agent system for using the proxy of FIG. 1.

Reference is now made to FIG. 2, which shows the process of using the proxy server of FIG. 1 from the point of view of the agent 12. From the point of view of the agent the procedure consists of a method of semi-automatic prefilling of client data into a web form issued by a server, prior to submission to the server over a network. The method comprises submitting client data to the proxy, stage 30, receiving in stage 32, from the proxy, a version of the web form from the server which already has the submitted client data at least partly filled in; in stage 34 reviewing and modifying as necessary the filled in data, and then in stage 36 submitting the reviewed/modified form to the proxy for ongoing submission to the server. If the form is not accepted then it is received back in stage 38 with the server errors transformed into comments. The form is then further reviewed and modified as necessary in stage 40 and then resubmitted in stage 42.

Figure 3:
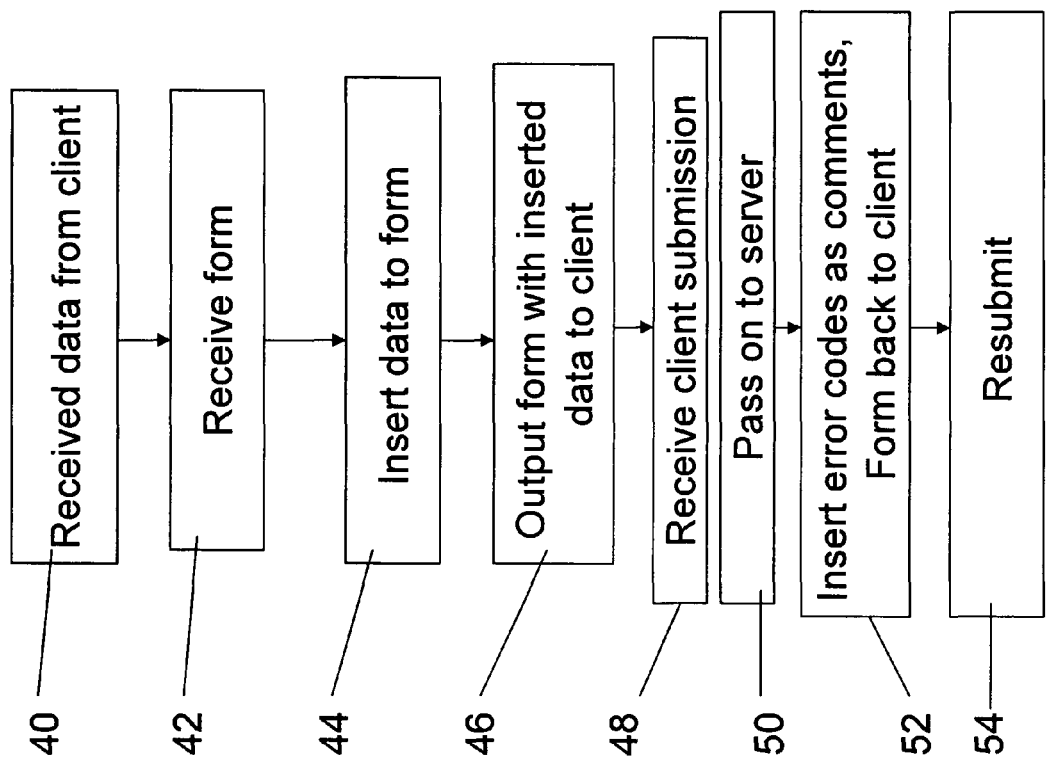
FIG. 3 is a simplified flow chart illustrating a procedure at the proxy of FIG. 1 according to a preferred embodiment of the present invention.

Reference is now made to FIG. 3, which is a simplified diagram summarizing the method, as outlined above, of bridging between client and server web interfaces, from the point of view of the proxy server. The method comprises stages as follows. The proxy receives data from the client web interface in a stage 40. In a stage 42 the proxy requests and obtains a data input form from the server's interface. The data stream that represents the data input form is modified by adding the client data to the form in stage 44. Then the modified form is sent to the client in stage 46. In stage 48, after a user at the client end has had the opportunity to review the form with the data, the data is then received back from the client end, with or without modifications. In stage 50 the data is submitted to the server and in stage 52, if the server does not accept the submission then any error codes received are used as the basis for comments inserted into the modified data for output to the client. The client then gets to see the form with the data as entered by him and with the error codes inserted as comments and is able to modify the form accordingly, for resubmission. Stage 54 indicates the resubmission.

As will be explained below, sometimes data is simply not compatible with the field it is supposed to be entered into, and thus stage 44 includes identifying such data and including a comment rather than actual entry of data into the relevant field. The comment preferably includes the content of the data that is not entered so that the agent does not lose any information.

Figure 4:
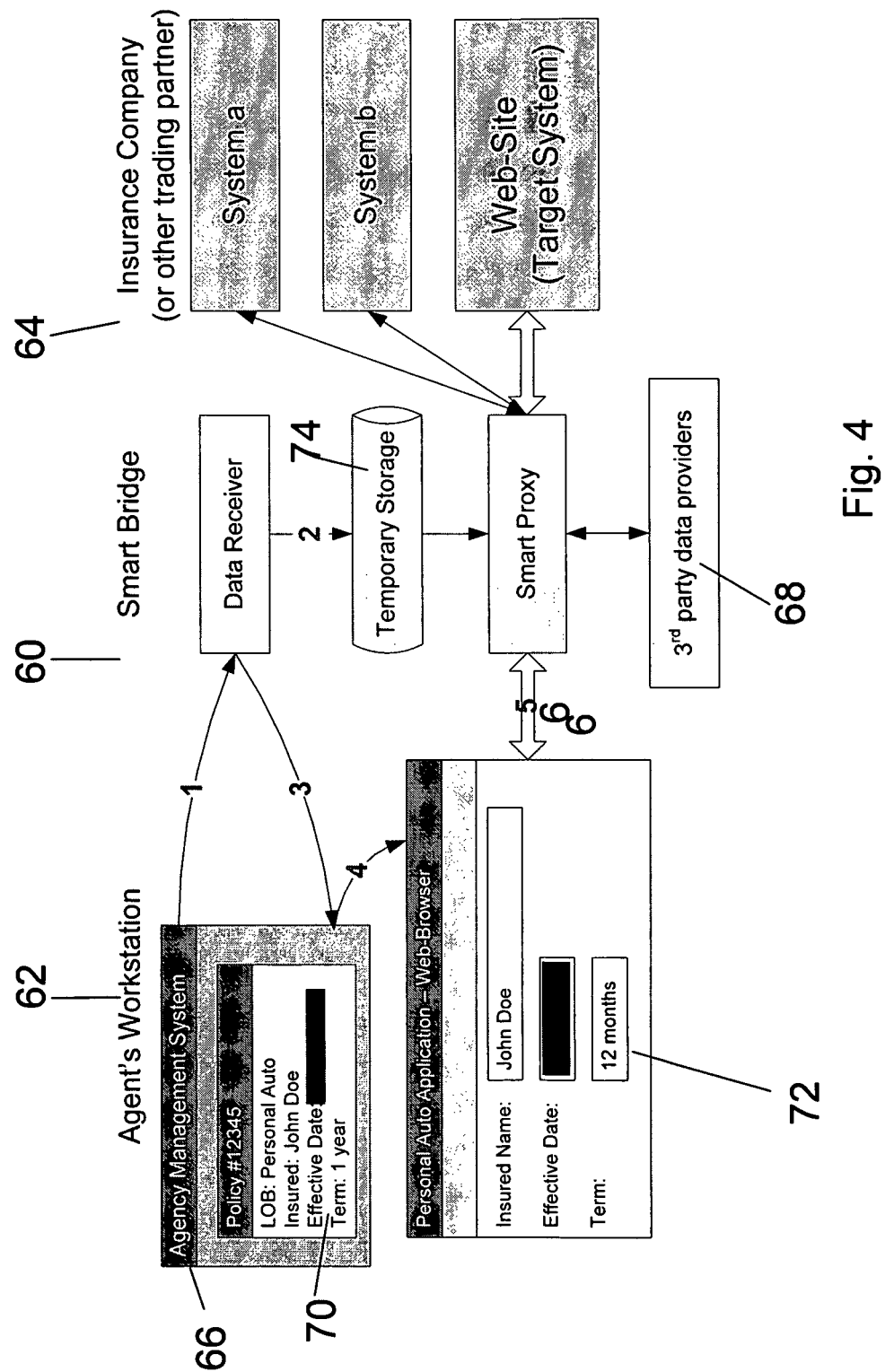
FIG. 4 is a simplified block diagram illustrating the proxy server, the agent system and the target system of FIG. 1 in greater detail according to a preferred embodiment of the present invention.

The proxy server is now considered in greater detail, with particular reference to FIG. 4, which shows the system of FIG. 1 with additional details.

In order to provide compatibility between systems having different web interfaces an intermediary application, herein smart bridge or proxy 60 is located on a network between client 62 and a server 64, carrying a target system intended to receive the data of the client 62. As an example the client 62 may be an insurance agent and the target system may be the insurance carrier, accessed through the insurance carriers' web-site.

The Smart Bridge or Proxy 60 operates as a non-transparent reverse proxy between the agent's browser and the carrier's web-application, as explained. A standard or transparent reverse web-proxy as is known in the art, forwards the information to and from the web-server as-is, without changing its content. However, proxy or bridge 60, which is non-transparent, actually changes the HTML streams generated by the web-server 64 by inserting data values into the relevant elements on the HTML forms that flow via the proxy 60 from web-site 64 to agent's browser 62. Transparent and non-transparent proxies are more particularly discussed in RFC 2616 (Hypertext Transfer Protocol—HTTP/1.1), which offers the following definitions:

"A 'transparent proxy' is a proxy that does not modify the request or response beyond what is required for proxy authentication and identification.

"A 'non-transparent proxy' is a proxy that modifies the request or response in order to provide some added service to the user agent, such as group annotation services, media type transformation, protocol reduction, or anonymity filtering."

From the agent's standpoint, the data entry screens of the carrier's web-site come pre-filled with the agent's own information and the process flow is automated. The information that has been entered, information 70 from the agency management system 66, is combined as necessary with information from different data sources such as third party data providers 68 and other carrier systems.

As explained, data is generally mapped onto the form of the target system since the target system interface is known. The data 70 submitted from the agent is inserted at proxy or bridge 60 into the data stream from source 64 to fill an HTML data input form received in a data stream from the target system 54. The modified data stream is then forwarded to agent 62 and can be viewed in web browser window 72.

In some cases, portions of the exported information cannot be mapped directly onto the target system's forms. For example the field may only accept values within a certain range, and the input data is outside the range. In such a case the data stream is not modified by adding the data directly to the relevant input field. Rather, as will be explained below, a hint is typically provided to the users to let them choose the most appropriate value manually.

Referring now to the numbered arrows in FIG. 4, the procedure is as follows:

1. Agent 62 exports information from the Agency Management System 66. The most modern standard for data exports from Agency Management Systems is ACORD XML, but any structured data can be consumed.
2. The data receiver or input module of the Smart Bridge or proxy 60 stores the data from ACORD XML, say in temporary storage 74.
3. The proxy provides an instruction to agent 62 to open a browser and navigate it to the Smart Proxy 60.
4. Agent 62 receives the Response and opens an Internet Browser window 72.
5. The browser connects to the Smart Proxy, which now operates as a non-transparent reverse proxy between the browser and carrier's web-site.
6. The Proxy module fetches data from the temporary storage and fills the carrier's web screen before presenting it to the user's browser.

Figure 5:
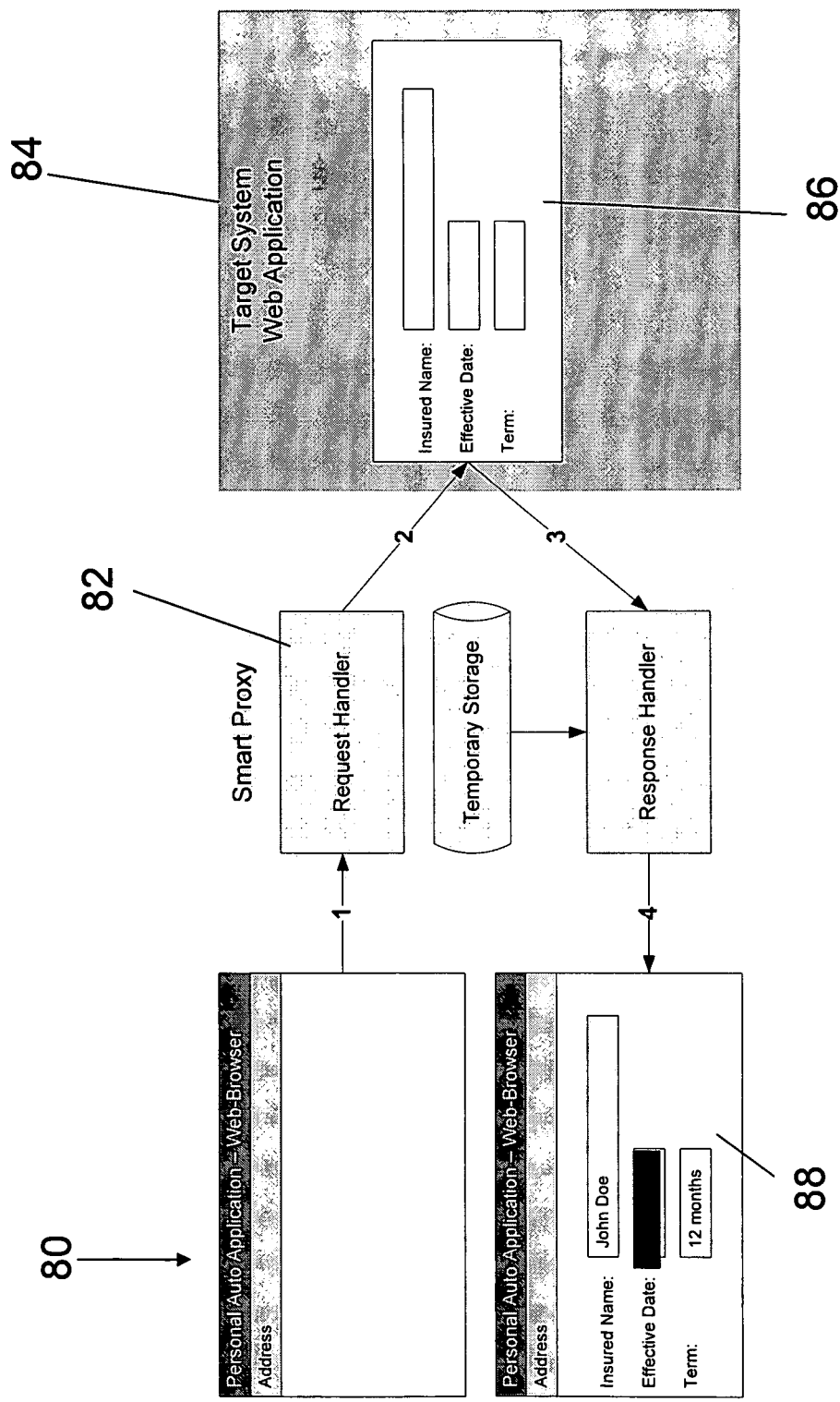
FIG. 5 is a simplified diagram illustrating system flow of the system of FIG. 4, according to a preferred embodiment of the present invention.

Reference is now made to FIG. 5 which illustrates the operation of the bridge or proxy 60 in terms of process steps and resulting screens.

1. Web browser 80 at agent 62 sends an HTTP Request that is handled by the Proxy's Request Handler 82.
2. The request handler makes the necessary changes and forwards the request to the carrier's web-site.
3. Carrier's web-application 84 at the target system treats the request as if it arrived from a regular browser and responds with the relevant blank HTML page for data entry, web form 86.
4. The Proxy then
    Scans the HTML and identifies data entry elements (INPUT, SELECT, etc).
    Modifies data-entry elements by adding values from exported data in Temporary Storage and/or any other data source.
    If necessary, adds client-side scripts.
    Forwards the Modified HTML to the browser, so that the browser shows the web form with data inserted 88.

The agent's browser 80 subsequently submits the page. Submission may be either automatic or following user input, and the information that was embedded by the proxy into the modified HTML is sent to the server, thus eliminating re-keying.

In the above, the information from the source system, in this example ACORD XML, is stored in the Temporary Storage as is, without any need to translate it to any proprietary data model. Proxy 62 uses XPath to fetch data values. Xpath, an acronym for XML Path Language, is an expression language for addressing portions of an XML document, or for computing values such as strings, numbers, or boolean values, based on the content of an XML document.

The XPath language is based on a tree representation of the XML document, and provides the ability to navigate around the tree, selecting nodes by a variety of criteria. In popular usage, an XPath expression is often referred to simply as an XPath.

Use of XPath allows data to be mapped from a data form consistent with one system to a data form consistent with another data system. Where data is not compatible, XPath is able to deal with the issue as an exception. Thus the problem of incompatibility between data systems is solved.

Figure 6:
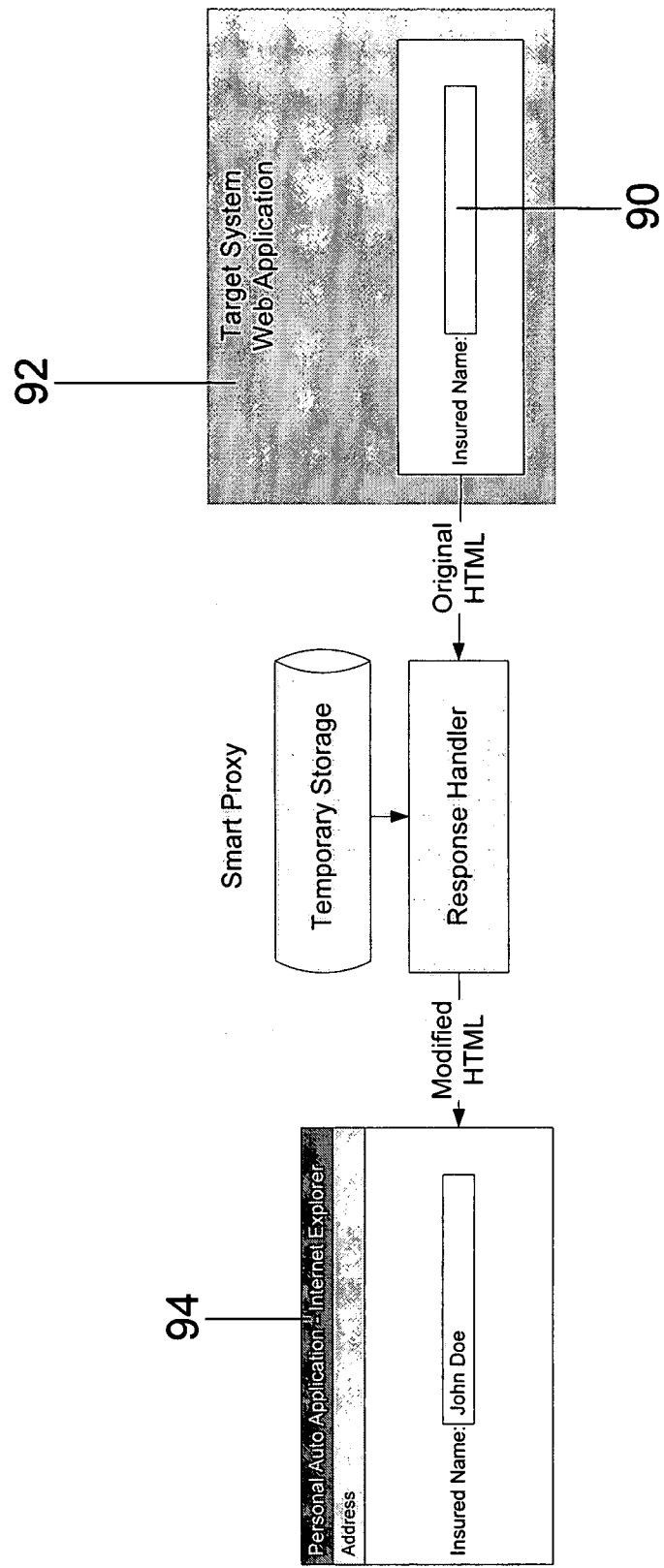
FIG. 6 is a simplified diagram illustrating a procedure for entering client data into a simple field of the target system HTML according to a preferred embodiment of the present invention.

Reference is now made to FIG. 6, which illustrates an example to show how the proxy fills-in a textual field (Insured Name) 90 that appears on the HTML page 92 generated by carrier's web-application.

The fragment of the original HTML, which would have been created by the carrier's web-site might appear as in Table 1 below

TABLE 1

HTML Code for Insured Name Field

```
<TR>
    <TD>Insured                              Name:</TD>
    <TD><INPUT    Id="InsuredName"    TYPE=TEXT></TD>
</TR>
```

A fragment of the data exported from the source system and stored in Temporary Storage, which fragment corresponds to the field 90 may appear as in Table 2 below.

TABLE 2

Fragment of HTML from source carrying insured name data

```
<PersonName>
    <Surname>Doe</Surname>
    <GivenName>John</GivenName>
</PersonName>
```

The proxy now modifies the HTML from the target system by adding "John Doe" from the source as a pre-filled insured name, thus producing modified HTML as in Table 3 below.

TABLE 3

Modified HTML for sending to browser.

```
<TR>
    <TD>Insured                              Name:</TD>
    <TD><INPUT Id=InsuredName TYPE=TEXT
    VALUE="John Doe"></TD>
</TR>
```

The user receives the modified HTML which in his browser has the effect of showing the screen pre-filled with the data from the source system, screen 94 in FIG. 6.

Figure 7:
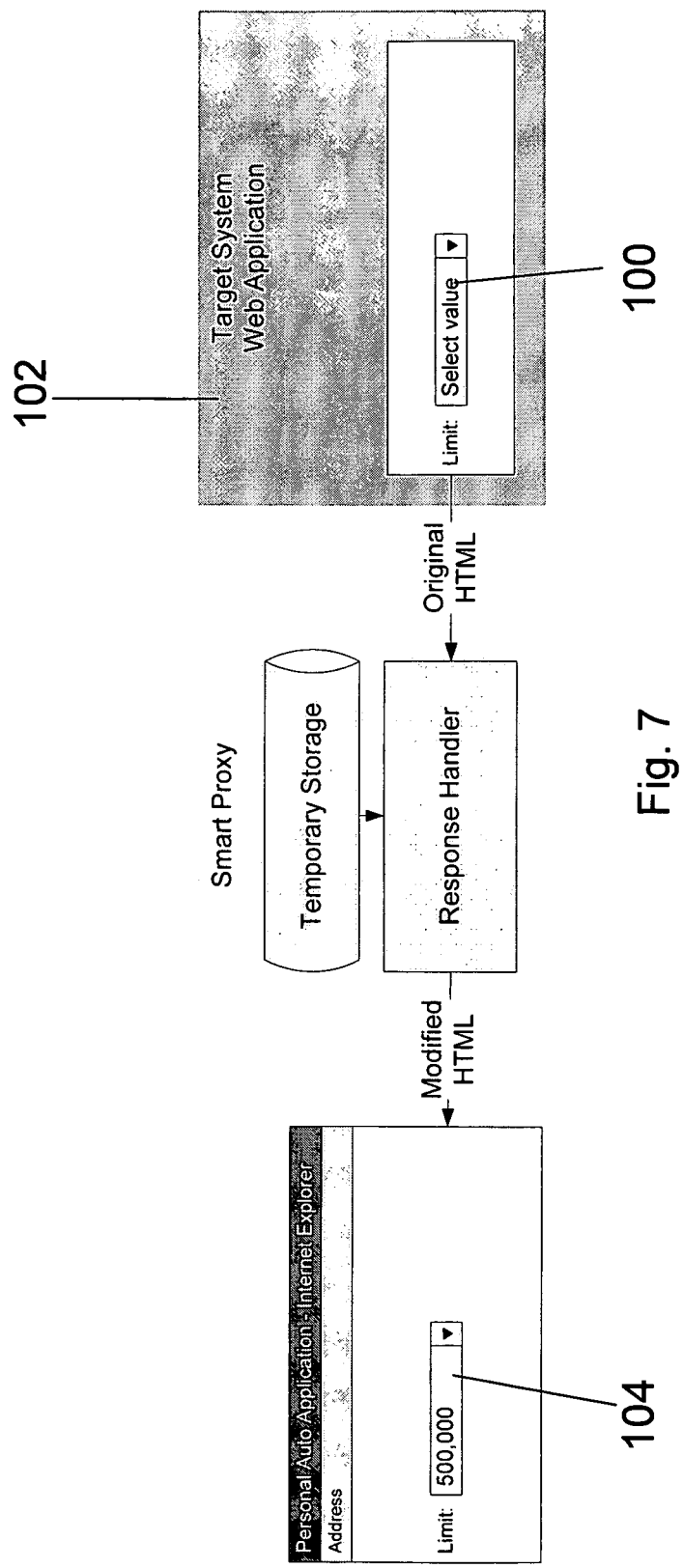
FIG. 7 is a simplified diagram illustrating a procedure for entering client data into a limit field of the target system HTML according to a preferred embodiment of the present invention.

Reference is now made to FIG. 7 which is an example demonstrating how the proxy handles a select field, Limit, 100 that appears on the HTML page 102 generated by the carrier's web-application.

The fragment of the original HTML (created by carrier's web-site) may appear as in table 4 below.

TABLE 4

Limit Field HTML Fragment

```
<SELECT                                      Id="Limit">
    <OPTION>Select                           limit</OPTION>
        <OPTION>500,000</OPTION>
        <OPTION>1,000,000</OPTION>
</SELECT>
```

The fragment of the data exported from the source system and stored in Temporary Storage which is relevant to the limit field might appear as in table 5 below.

TABLE 5

Limit Data for insertion into a limit field

```
<Limit>
    <FormatInteger>500000</FormatInteger>
</Limit>
```

The proxy matches the limit value in the Temporary Storage to one of the options in the select box and modifies the HTML by signing it as the default value of the select box. The result is in table 6 below.

TABLE 6

Data of Table 5 Inserted into Field of FIG. 4

```
<SELECT                                      Id="Limit">
    <OPTION>Select                           limit</OPTION>
    <OPTION DEFAULT>500,000</OPTION>
    <OPTION>1,000,000</OPTION>
</SELECT>
```

The user receives the modified HTML of Table 6 which appears in his browser as a screen 104 pre-filled with the data from his own source system.

Figure 8:
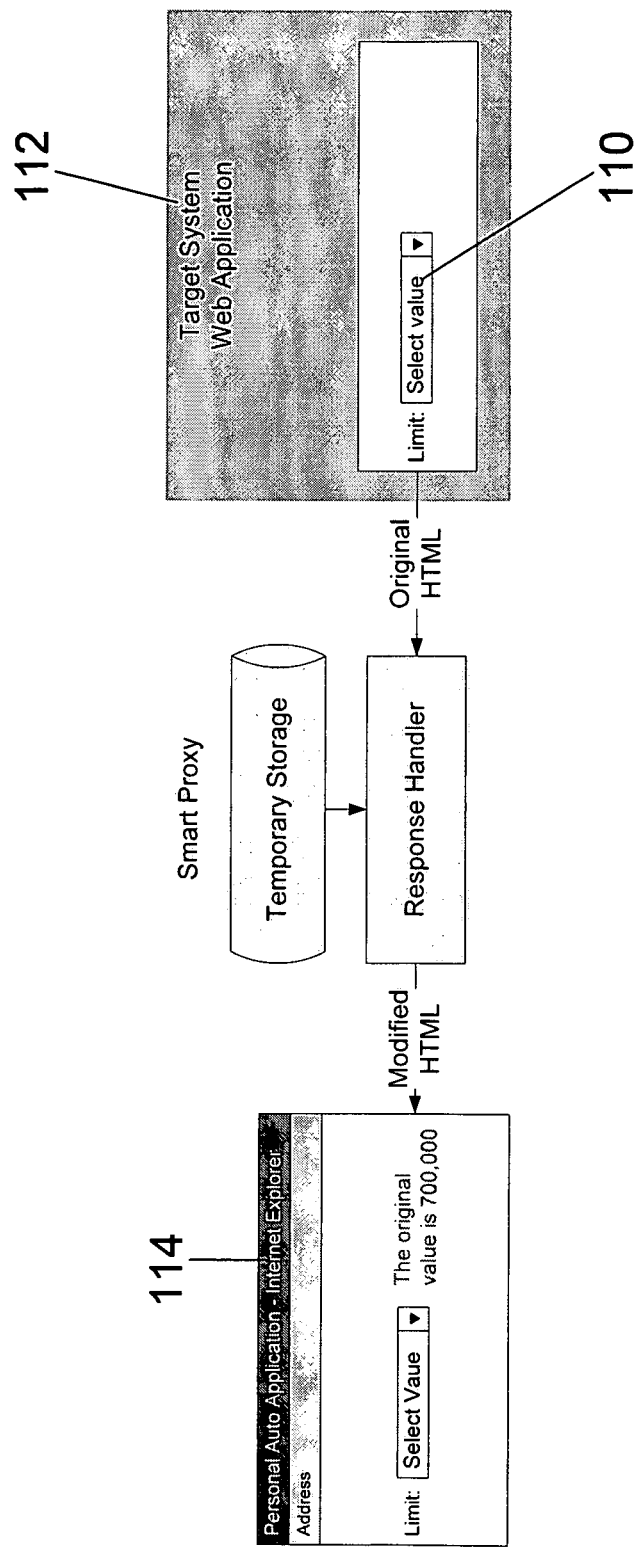
FIG. 8 is a simplified diagram illustrating a procedure for entering client data into a limit field of the target system HTML wherein the data is not compatible with the limits, according to a preferred embodiment of the present invention.

Reference is now made to FIG. 8 which is a further example, this time demonstrating how the proxy handles a select field limit value when the value from AMS cannot be matched to one of the possible options in the select box. Select field 110 is produced by target application 112.

The fragment of the original HTML created by carrier's web-site, may appear as in table 7.

TABLE 7

HTML Code for a limit field

```
<SELECT                                      Id="Limit">
    <OPTION>Select                           limit</OPTION>
    <OPTION>500,000</OPTION>
    <OPTION>1,000,000</OPTION>
</SELECT>
```

The fragment of the data exported from the AMS and stored in Temporary Storage may appear as in Table 8.

TABLE 8

HTML Fragment for data to be entered into Limit Field

```
<Limit>
    <FormatInteger>700000</FormatInteger>
</Limit>
```

The proxy cannot match the limit value in the Temporary Storage to one of the options in the select box. The 700,000 does not allow selection of either the 500,000 or the 1,000,000 options, so instead the proxy adds a comment to the user. The modified HTML code generated at the proxy thus includes the selection box and the comment, and is shown in Table 9. The code generates screen or browser window 114.

TABLE 9

HTML Fragment produced by the proxy which provides the selection box together with a comment.

```
<SELECT                              Id="Limit">
   <OPTION>Select                    limit</OPTION>
   <OPTION>500,000</OPTION>
   <OPTION>1,000,000</OPTION>
</SELECT>
<SPAN CLASS="SmartProxyComment">The original value is
700,000</SPAN>
```

Although, in this case the limit field 110 could not be pre-filled by the proxy, the comment includes the information so that no information is lost. The user sees the original limit values as well as the comment in his browser screen 114 and can make up his own mind on sorting out the problem.

Using Scripts

There are a number of situations in which the Proxy may add client-side scripts to the Modified HTML. This can be done in addition to or instead of modifying HTML elements of the affected fields as demonstrated in the examples above.

Automatic Data Submission

In many cases the information in the exported data is sufficient to fill some, or even all, of the fields and screens and submit them without any user assistance. To support automated submission, the proxy adds a client side script that simulates the operation a user performs after entering screen data. For example, clicking a "Submit" button can be simulated by adding the script in Table 10 below

TABLE 10 script for inserting submit functionality

```
<script for="window" event="load">document.all.Submit.-
click( );</script>
```

If the submission of the page fails, then the web-server returns the same screen but with an error message. In such a case the Proxy may be programmed not to add automatic submission script to the Modified HTML, and the user will be able to see the error message and make the necessary changes.

Supporting AJAX

Many modern web-applications make use of AJAX (Asynchronous JavaScript and XML) to create dynamic, more user friendly web applications. This means that changing information on screen may invoke some background processing. However since the proxy is a reverse proxy and it wants a page that functions independently from the target system it cannot simply pass on the page with the background processing functionality. For example, choosing a city from a select box may invoke a client-script function that populates another select box with the list of the possible zip codes. The functionality cannot be passed on directly. To preserve such functionality, instead of modifying the HTML by adding field values, the Proxy may add client side scripts that simulate entering values and invoking the necessary events.

Thus, instead of adding VALUE="John Doe" in FIG. 5 above, the proxy may insert into the Modified HTML an instruction such as shown in Table 11.

TABLE 11

Adding a script to the HTML

```
<script          for="window"              event="load">
   document.all["InsuredName"].Value="John     Doe";
</script>
```

Customization Methods

The proxy automatically performs standard operations such as pre-filling data, as explained above, and coping with challenges, as explained below. However, often it is necessary to perform additional modifications, hereinafter customizations.

Such customization can be performed in a number of ways as follows.

The proxy identifies events in the incoming HTML from the target system that can be implemented to perform custom operations and change default behavior.

Values of fields may be calculated by executing XPath expressions. XPath provides flexibility. For example XPath can be used to merely fetch a value from the XML data source. The value can be calculated from an unlimited number of data elements. Furthermore, up-to-date XML engines enable embedding of calls to custom functions from XPath. These functions can be used to perform virtually unlimited spectra of operations. For example, getting information from databases, calling web-services, interacting with MQ-Series/MS-MQ, etc.

Handling HTTP Cookies

Figure 9:
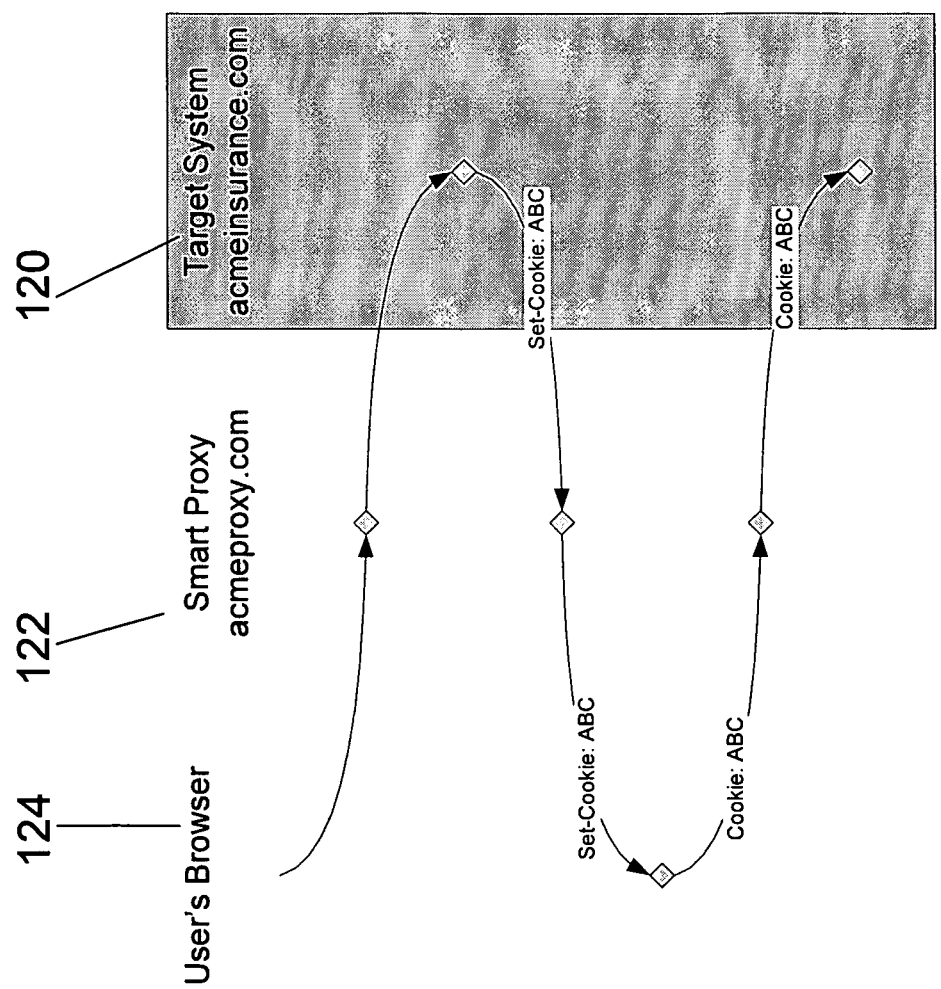
FIG. 9 is a simplified schematic diagram of a flow involved in managing cookies at a proxy according to a preferred embodiment of the present invention.

Reference is now made to FIG. 9 which is a simplified schematic diagram illustrating the handling of cookies and specifically a cookie handling path, in accordance with a preferred embodiment of the present invention.

HTTP Cookies are parcels of text sent by a server to a web browser and then sent back unchanged by the browser each time it accesses that server.

A transparent server simply passes on cookies in either direction without modification. The non-transparent server of the present embodiments however generally modifies text before passing on.

In the present embodiments, if target system 120 issues a cookie, then the cookie is forwarded by the proxy 122 to the browser 124. From the browser's perspective, the cookie is issued by the proxy 122, so on the subsequent requests the browser will attach the cookie and send it to the proxy. The Proxy then merely forwards the cookie to the target system's web-application.

The proxy 122 does not mimic the browser's behavior for handling cookies, but merely forwards cookies in both directions.

Handling Domain Names

Figure 10:
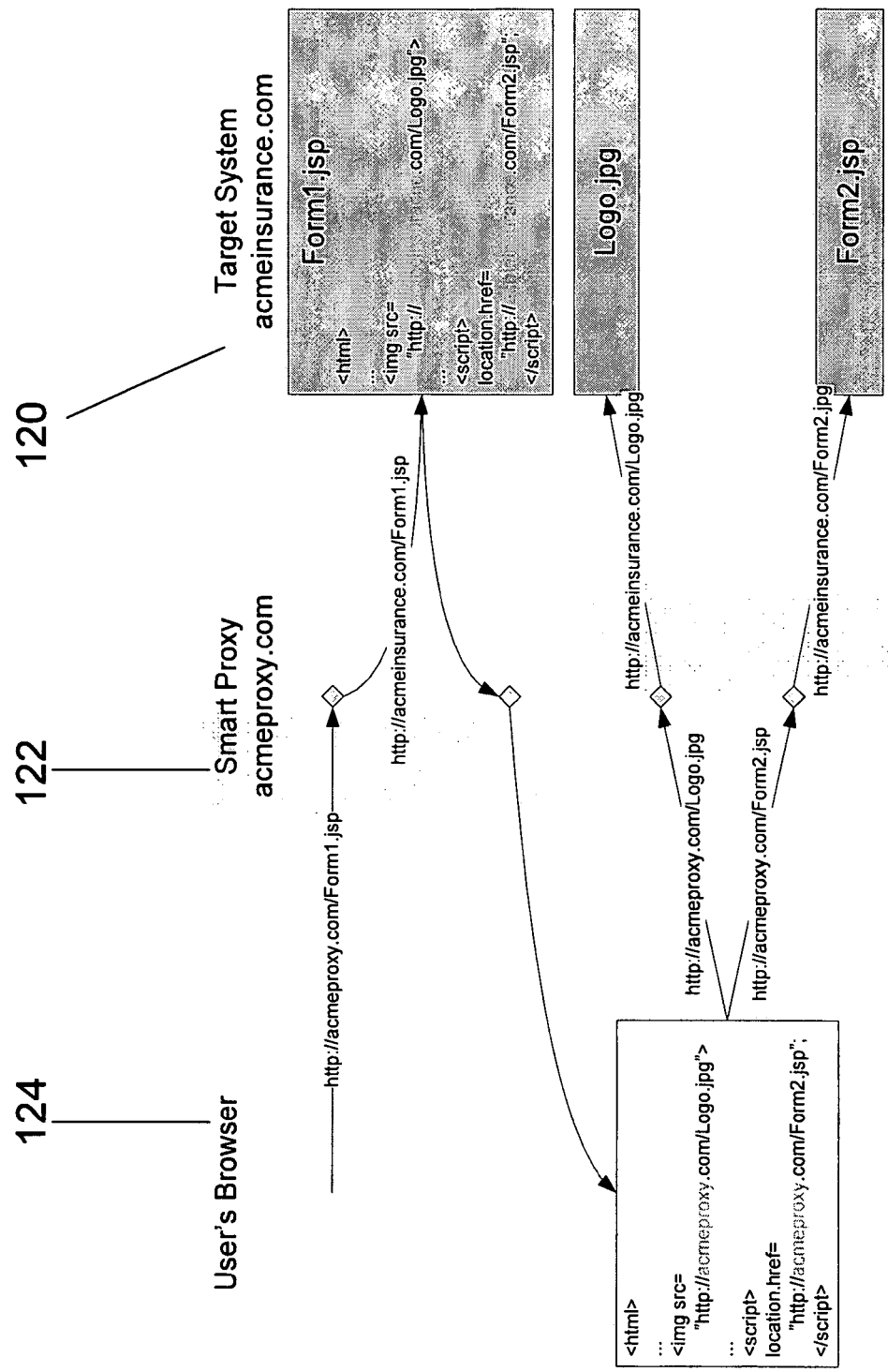
FIG. 10 is a simplified schematic diagram of a flow involved in managing domain names between the target server and the proxy on the one hand and between the client and the proxy on the other hand according to a preferred embodiment of the present invention.

Reference is now made to FIG. 10 which is a simplified schematic diagram illustrating how domain names within the HTML are treated. HTML pages often include references to other pages and resources. Some references contain domain names of the servers where the resources are located. In many cases this is the same server that produced the HTML page. For example, an HTML form often includes a reference to another page on the server, say where the form's data is to be posted when the user clicks the submit button, or where access can be obtained to the next page.

When the proxy 122 resides between the end user's browser and the web-application, the browser connects to the proxy's domain name, which is different from that of the application. Moreover, all the requests to the web-application flow through the proxy. To ensure this, the proxy modifies the domain names in the HTML pages flowing from the target system to the source system. As shown in FIG. 10, the domain name acmeinsurance.com at the target system is modified to acmeproxy.com at the browser side.

The proxy 122 leverages agent-facing web-applications such as carrier web-sites by adding data import from agency management systems without changing the web-application itself.

There is no need to replicate the business rules of the insurance carrier, merely to map between them and the agents.

The proxy is tolerant to changes in the web-site. If the mapping system cannot identify one or more fields, the process will not fail, since the remaining fields are still correctly mapped, but the user will need to enter the data manually.

The proxy 122 can be installed behind the carrier's firewall or it may be hosted at an external location.

The proxy 122 can work with any structured data, not only with ACORD XML. It can also access external data sources.

The proxy 122 provides flexibility. It can be used for merely pre-filling data, or it could be used to make up a completely redesigned interface and fully automated user workflow, as desired.

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Proxy apparatus for location on a network between one or more client applications and a server application the client applications being browser applications and the server application being a web site application, the apparatus comprising:
an input unit for receiving content data from a target server running said server application, said content data comprising a content interface, the input unit further comprising a client data receiving unit for receiving input data from a first client browser application, said client input data being arranged according to a client interface;
a modifying unit associated with said client data receiving unit configured for modifying said content data received from said server web site application by insertion therein of client data, said insertion being according to a mapping between data fields of said content interface and data fields of said client interface, said mapping being predetermined prior to reception of said content data, respective mappings being provided for different client interfaces; and
a handling unit configured for submitting said modified content data to said first or another client browser application to allow the first or another client browser application to further modify said client data within said modified content data and submit said further modified content data back to said proxy apparatus for subsequent submission to said server, wherein said proxy apparatus operates as a non-transparent reverse proxy between said first or another client browser application and said server web site application, wherein said proxy apparatus changes an HTML stream generated by said server web site application by inserting data values into corresponding elements on HTML forms that flow via the proxy apparatus from the server web site application to said first or another client browser application so that elements in a client data entry screen of said server web site application are pre-filled with information, thereby allowing an automated process flow.

2. The proxy apparatus of claim 1, further comprising a server response handling unit for submitting said modified or further modified content data to said application server and for forwarding back any server response to allow the said or another client browser application to further modify said client data for resubmission.

3. The proxy apparatus of claim 1, wherein said content data comprises a data form with labeled fields arranged according to said content interface, and said client data comprises separate data items, each of said separate data items being mapped to respective ones of said labeled fields.

4. The proxy apparatus of claim 1, further comprising a cookie management mechanism for transferring cookies between said server and said client in transparent fashion.

5. The proxy apparatus of claim 1, wherein said handling unit is configured to add program scripts to provide interactivity at said first or another client browser application.

6. The proxy apparatus of claim 3, wherein said modifying unit is further configured to identify cases where client data is incompatible with a requirement of a corresponding one of said data fields and to output a comment to said client browser application.

7. The proxy apparatus of claim 1, further configured with a domain name handling unit configured to replace domain name data of said content data with domain name data of said proxy apparatus in output to said client application.

8. A method of semi-automatic prefilling of client data into a web form issued by a server web site prior to submission to the server web site over a network, the method carried out on a networked micro-processor, the method comprising:
receiving a plurality of predetermined mappings between data fields of respective client browser interfaces and data fields of said web form at a proxy;
submitting client data arranged according to data fields of a respective client interface to a proxy;
receiving from said proxy a version of the web form from said server with said submitted client data filled in to the data fields according to said respective predetermined mapping;
modifying as necessary said filled in data in said web form to provide a modified web form; and
submitting said modified web form to said proxy for ongoing submission to said server web site, wherein said proxy operates as a non-transparent reverse proxy between said respective or another client browser interfaces and said server web site, wherein said proxy changes an HTML stream generated by said server web site by inserting data values into corresponding elements on HTML forms that flow via the proxy from the server web site to said respective or another client browser interfaces so that elements in a client data entry screen of said server web site are pre-filled with information, thereby allowing an automated process flow.

9. The method of claim 8, further comprising:
receiving from said proxy comments regarding errors indicated by said server web site;
modifying said form in light of said comments, and resubmitting said form.

10. A method of bridging between client browser and server web site interfaces at a proxy server, the method carried out on a networked micro-processor, the method comprising:
receiving a predetermined mapping between data fields of a data input form and data fields of a given client browser interface, other client browser interfaces having respectively different predetermined mappings;
receiving data from said client browser interface;
obtaining a data input form from said server web site interfaces,
modifying said data input form by addition of said received client data, said modifying using said predetermined mapping to direct respective data to corresponding data fields,
forwarding said modified input form to said client browser for further modification,
receiving from said client said input form for submission to said server web site interfaces,
submitting said form to said server web site interfaces; and
outputting to said client any error codes to allow for further modification, thereby to allow submission of said client data into said server web site interfaces wherein said proxy server operates as a non-transparent reverse proxy between said given or another client browser interface and said server web site interfaces, wherein said proxy changes an HTML stream generated by said server web site interfaces by inserting data values into corresponding elements on HTML forms that flow via the proxy apparatus from the server web site interfaces to said given or another client browser interface so that elements in a client data entry screen of said server web site interfaces are pre-filled with information, thereby allowing an automated process flow.

11. The method of claim 10, further comprising noting when data input from said client browser is not compatible with said input form, and inserting a comment in respect thereof to said modified input form.

12. The method of claim 11, wherein said comment is arranged to preserve information of said client browser.

13. The method of claim 10, further comprising:
obtaining data from a third party data provider; and
further modifying said data input form by addition of said obtained third party data.

* * * * *